L. R. N. CARVALHO.
MACHINE FOR MAKING RECEPTACLE CLOSURES.
APPLICATION FILED JAN. 31, 1914.

1,254,026.

Patented Jan. 22, 1918.
2 SHEETS—SHEET 1.

Witnesses:

Inventor
Leslie R. N. Carvalho
By his Attorney
Charles H. Wilcox

L. R. N. CARVALHO.
MACHINE FOR MAKING RECEPTACLE CLOSURES.
APPLICATION FILED JAN. 31, 1914.
1,254,026.
Patented Jan. 22, 1918.
2 SHEETS—SHEET 2.
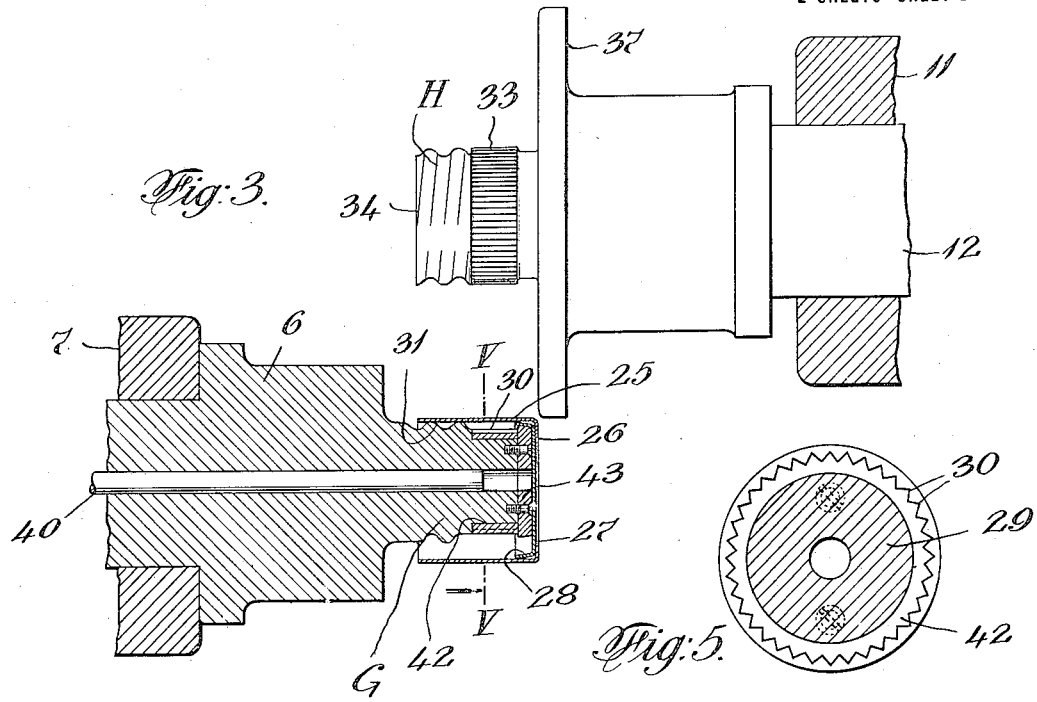
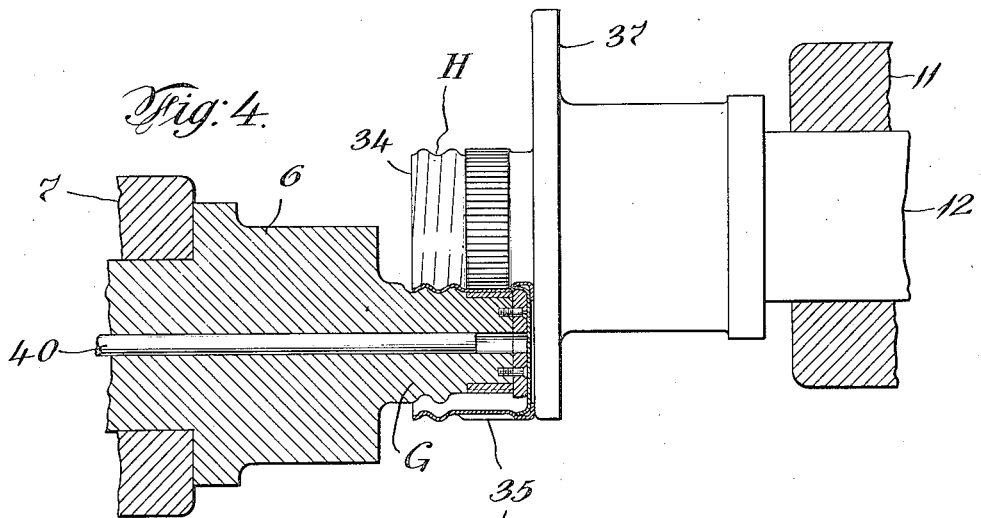
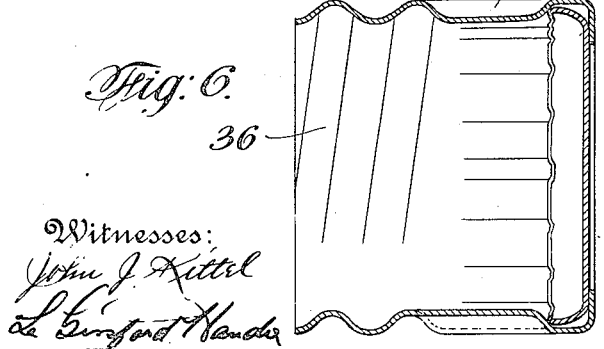
Witnesses:
John J. Kittel
L. Binford Hender
Inventor
Leslie R. N. Carvalho
By his Attorney
Charles H. Wilson

UNITED STATES PATENT OFFICE.

LESLIE R. N. CARVALHO, OF BROOKLYN, NEW YORK, ASSIGNOR, BY DIRECT AND MESNE ASSIGNMENTS, TO PARAGON METAL CAP CO., OF BROOKLYN, NEW YORK, A CORPORATION OF NEW YORK.

MACHINE FOR MAKING RECEPTACLE-CLOSURES.

1,254,026.   Specification of Letters Patent.   Patented Jan. 22, 1918.

Application filed January 31, 1914.   Serial No. 815,671.

*To all whom it may concern:*

Be it known that I, LESLIE R. N. CARVALHO, residing at Brooklyn, in the county of Kings and State of New York, have invented certain new and useful Improvements in Machines for Making Receptacle-Closures, of which the following is a specification.

This invention relates to a mechanism for the manufacture of receptacle closures, such closures for instance as those used upon bottles and the like, and the particular object of the invention is to provide a new and improved machine for producing rigid closures built up from a plurality of separately formed sheet metal pieces, to the end that the manufacture of the closures may be materially cheapened and at the same time result in an attractive and efficient article.

A further object is to provide a machine as above by means of which caps or closures may be formed from sheet metal with a minimum of waste, and by means of which previously coated or decorated sheet metal may be formed into closures without injury to or removal of the coating or decoration.

A further object is to provide a machine by the use of which the means whereby the closure may be attached to a receptacle is formed on the closure simultaneously with a fastening together of the pieces of the sheet metal which go to make up the closure.

A still further object is to provide a machine by means of which a cylindrical part and a cover part may be connected together, and by means of which adjacent portions of the cylindrical part and cover part are interlocked with each other in such manner that a wedge action is always present between said parts to retain the parts in rigid relation to each other.

Other objects and aims of the invention, more or less specific than those referred to above, will be in part obvious and in part pointed out in the course of the following description of the elements, combinations, arrangements of parts and applications of principles, constituting the invention; and the scope of protection contemplated will be indicated in the appended claims.

In the accompanying drawings which are to be taken as a part of this specification, and in which I have shown a merely preferred form of embodiment of the invention:

Fig. 3 is a further enlarged detailed view partly in section of the immediate portions which act upon the material of the closure.

Fig. 4 is a view similar to that shown in Fig. 3, illustrating the parts in operating position.

Fig. 5 is a further enlarged transverse sectional view upon the line V V of Fig. 3, and Fig. 6 is a transverse sectional view of a completed closure.

Figure 1:
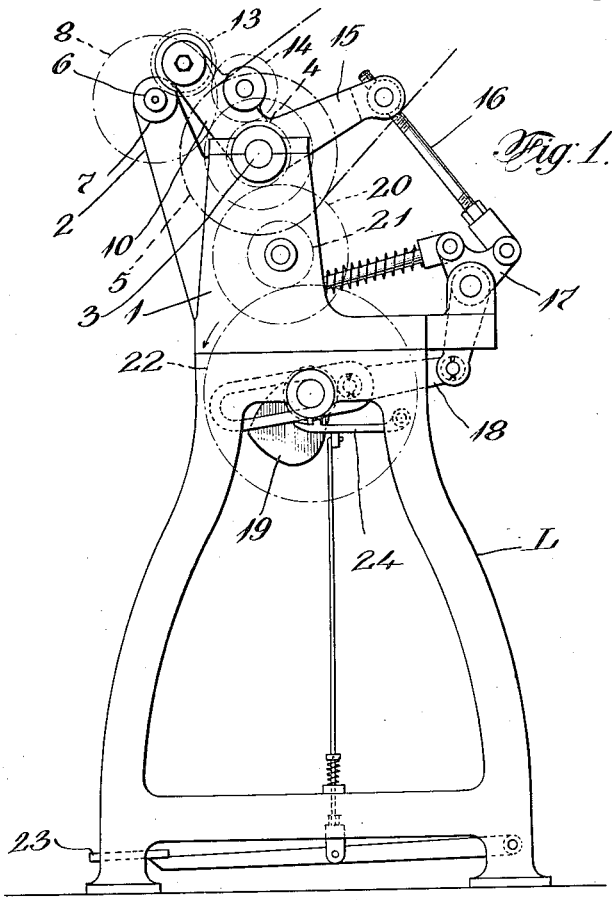
Figure 1 is an end elevational view of a machine embodying this invention.
Figure 2:
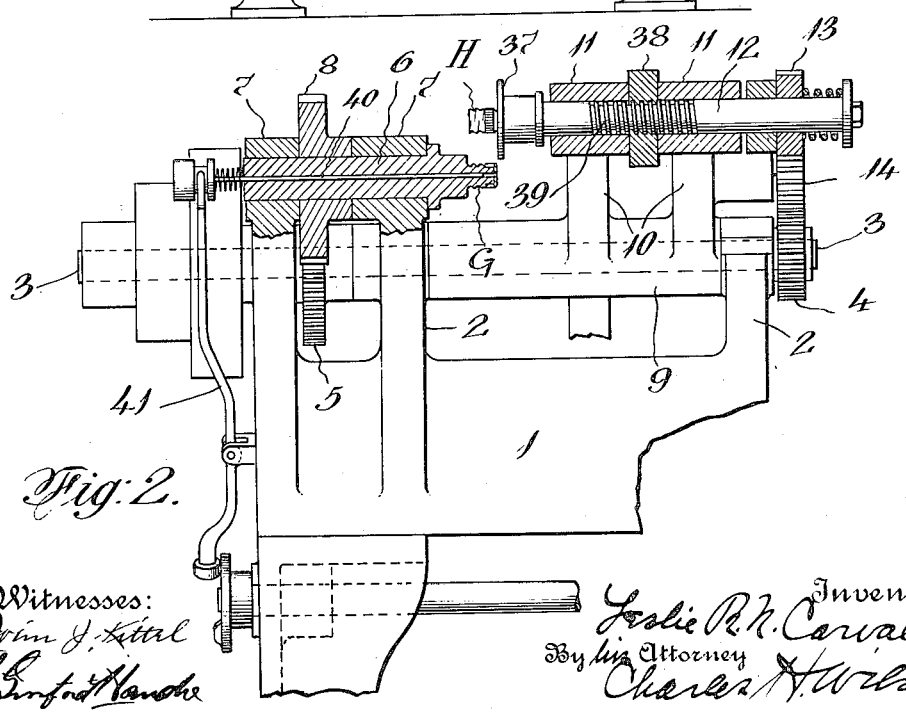
Fig. 2 is a side elevational view of the machine on an enlarged scale, portions being illustrated in longitudinal section for better disclosing structural details.

Referring to the drawings for a detailed description of the machine illustrated, the reference character L indicates a main frame supporting a head 1. Spaced bearing standards 2 project upwardly from the head 1 and support the main drive shaft 3 upon which are mounted a pair of gears 4 and 5. A mandrel shaft 6 is mounted in bearings 7 which also project upwardly from the head 1 in spaced relation. A gear 8 is fixed to the shaft 6 and engages the gear 5 so as to be positively driven thereby from the shaft 3.

A rocking frame 9 is mounted upon a portion of the shaft 3 and comprises a pair of arms 10 which project laterally from said shaft into proximity to the plane of the shaft 6, being formed with spaced bearings 11 at their ends. A shaft 12 is rotatably mounted in the bearings 11 and a gear 13 is frictionally engaged with said shaft 12 and operatively connected, through idler gear 14, with the gear 4 on the shaft 3. The frame 9 also comprises a laterally extending operating arm 15, which is connected by link 16 with lever 17 pivotally mounted upon the head 1. A link 18 extends from one end of the lever 17 into operative relation with a cam 19 driven from the main shaft 3, through gears 20, 21 and 22 which engage the gear 4 upon the shaft 3.

The rotation of the cam 19 may be continuous, but is preferably under the control of a foot lever 23, suitable friction or like means being provided in connection with drive shaft 3. The foot lever is connected to operate a dog 24 so as to move the dog into and out of position for arresting rotation of the cam.

By means of this construction it is apparent that rotation of the cam 19 will move the lever 17 so as to swing the rocking frame 9 so that the shaft 12 carried thereby will move toward and away from the longitudinal plane of the mandrel shaft 6.

The shaft 6 extends from a point adjacent one end of the machine to a point approximately midway in the length thereof, and the shaft 12 extends from a point slightly over-lapping the adjacent end of the shaft 6 toward the opposite end of the machine and the over-lapping portions of the two shafts are provided with suitable formations for giving shape to the blank closure, operation of the foot lever 23 serving to bring the lapping parts into contact with each other as is already apparent, except for the interposition of portions of the closure which it will be understood is given shape by the pressure of these lapping portions toward each other according to the shape of said lapping portions. The lapping portions thus constitute dies.

In operation, a closure in its blank form, comprising a smooth cylindrical part 25 having an inturned flange 26 at one end, and a cover part 27 within the cylinder engaging the flange thereof and in turn having a flange 28 engaging the inner walls of the cylinder, is telescoped over the end of the shaft 6 so that the inner surface of the cover engages against the outer end surface of the shaft. The shaft 12 is then caused to move toward the shaft 6 so that the die portion thereof presses against the exterior surface of the cylinder 25 and bends in portions of the cylinder according to the coöperating shapes of the two dies. In the instance illustrated, the die comprised in the end of the shaft 6, which may be referred to hereinafter as die G, is formed with a corrugated surface 30, in that portion adjacent the flange end of the cylinder, and with a threaded portion 31 in that portion toward the open end of the cylinder. The other die, H, is provided with an annular corrugated portion 33 and threaded portion 34 to mate the portions 30 and 31 of the die G so as to give to the cylinder a longitudinally corrugated annular upper portion 35 and a threaded lower portion 36. The corrugations 35 obviously comprise strengthening ribs for the closure and provide a convenient and efficient finger grip by means of which the completed closure may be rotated to engage the threaded portion with coöperative formations on a receptacle.

The corrugated portions 30 and 33 of the dies are so proportioned and positioned relatively to the flange 28 of the cover part 27 of the closure that when said dies are moved toward each other and bend in portions of the cylinder part to form stiffening ribs, the upper end surfaces of said stiffening ribs wedge against the lower edge portion of the flange 28 and bend said flange, particularly its lower edge portion. The flange being, by its nature, somewhat resilient, the bending in thereof by the upper ends of the stiffening ribs or corrugations induces a spring force tending to wedge the lower edge of the flange upwardly and outwardly along the inclined surface of the ends of the corrugations, continually urging the cover part into close and rigid engagement with the flange 26 of the cylinder. Portions of the flange 28 of the cover part not directly engaged by the upper ends of the corrugations are not bent to the same extent as are the engaged portions, and this results in a corrugation of the lower edge of the flange 28 to correspond and interengage with the corrugations or stiffening ribs of the cylinder and further lock the parts together, especially against interrotation, as set forth in my co-pending applications, Serial Nos. 742,850, and 787,311, for process of manufacture.

It is, of course, apparent that the dies are rotated during the operation above described and that by this means the full circumference of the closure is treated.

During this operation any suitable means may be employed for retaining the closure clamped against the end of the die G, but preferably for this purpose I provide a flange 37 upon the shaft 12 adjacent the die portion thereof and so proportioned and arranged as to assume a position overlying the end of the die G. The flange is annular so as to remain in this overlying relation during the full period of the operation notwithstanding the rotation of the flange. Any suitable means may be provided for adjusting this flange to the proper position for clamping flange 26 of the cylinder part in close engagement with the cover part of the closure, but for this purpose I preferably provide a rotatable clamp collar 38 upon the shaft 12 engaging threads 39 thereon and being held between the bearings 11—11. The collar 38 may be rotated slightly and clamped against further rotation relatively to the shaft. Thereafter the collar rotates with the shaft and by its engagement with the bearings 11—11 retains the shaft in adjusted longitudinal position, as will be understood.

After the operation of forming the corrugations and threads upon the closure, and after the die H is withdrawn, the closure is complete and is ready to be removed. For the purpose of effecting this removal, the shaft 6 is preferably formed with a longitudinal bore and a plunger rod 40 extends therethrough and is operated by a lever 41, or otherwise as may be desired, for engaging the inner surface of the cover part and thrusting the closure outwardly, the operation of the plunger rod being of course, properly timed to the movements of the dies.

In order that the corrugated portion 30 on the die G may properly coöperate with the corrugated portion 33 of the die H, said corrugated portion 30 is preferably formed upon an independent collar 42 freely rotatably mounted upon the die and held against displacement by a hardened plate 43 which is fixed to the end of the die and provides a suitable end surface therefor and which also provides a suitable shaped annular surface for engaging against the inner surface of the flange 28 of the cover part of the closure. The relative movement between the collar 42 and the remainder of die G is occasioned by the fact that this die is necessarily of smaller diameter than the die H and also than the interior of the closure cylinder in order that the closure may be readily removed when completed.

The machine is simple and is automatic in its movements. All of the operations upon the material of the closure are simple pressing operations and no drawing of the material is required, and thus the original coatings or other decoration, which may have been applied to one or both surfaces of the material prior to the pressing operation, is not injured.

The flange 37, which serves to clamp the parts of the closure together, is preferably smooth and is sufficiently wide to engage the whole extent of the flange 26 during the operation of the dies and thereby to press the entire extent of the flange 26 tightly against the cover part H.

It will be understood that various changes may be resorted to in the form, construction and arrangement of the several parts without departing from the spirit and scope of my invention, and hence I do not intend to be limited to the details herein shown and described except as they may be specifically included in the claims.

Having thus described my invention what I claim as new and desire to secure by Letters Patent, is:

1. A machine of the class described, comprising means for supporting the parts of a multi-part receptacle closure, and means coöperating with said supporting means for simultaneously clamping the parts together and locking said parts together, and forming a closure attaching means upon said closure.

2. A machine of the class described, comprising a clamp having parts engaging separate parts of a multi-part receptacle closure to clamp the parts of the receptacle closure against each other, and means for producing interlocking formations on said clamped parts of the receptacle closure.

3. A machine of the class described, comprising a clamp having parts engaging separate parts of a multi-part receptacle closure to clamp said parts of the receptacle closure together, one member of said clamp being movable toward the other member of the clamp into a given operative position relative to said other member, means for providing interlocking formations upon said clamped parts of the receptacle closure while the clamp is in such given position, and means whereby said given position may be altered at will.

4. A machine of the class described, comprising a horn over which the cylindrical part and cover part of a multi-part receptacle closure may be telescoped, a die movable toward said horn adapted to coöperate with the horn for locking together the cylindrical part and the cover part of the receptacle closure, and a clamp part movable with said die for coöperating with the horn to clamp the cylindrical part and the cover part in close relation during operation of said die.

5. A machine of the class described, comprising a horn adapted to receive the cylindrical part and the cover part of a multi-part receptacle closure telescoped thereover, a die movable toward said horn having parts to engage the cylindrical part of the receptacle closure to press in said parts for forming stiffening ribs thereon engaging against the cover part to serve as locking means to lock together the parts of the receptacle closure, and said die having parts for forming threads upon the cylindrical part of the receptacle closure simultaneously with the formation of said locking means.

6. A machine of the class described, comprising means for supporting the tubular part of a receptacle closure, means movable in two directions toward said supporting means having parts shaped to coöperate with parts of said supporting means simultaneously to form longitudinally extending corrugations and closure attaching means on said tubular part.

7. In a machine of the class described, rotary clamping members arranged to receive the wall of the tubular part of a receptacle closure between them, means for moving one of said clamping members in two directions toward the other whereby to retain said tubular part in position and to operate upon the inner and outer surfaces of the wall of said tubular part, and the opposing surfaces of said clamping members being shaped simultaneously to form a finger grip at one portion of said tubular part and closure attaching means at another portion thereof.

8. A machine of the class described, comprising a die for supporting the tubular part of a receptacle closure, a second die movable toward said first die for operating upon the receptacle closure, and one of said dies having an independently freely movable part thereon having portions to mate portions of the other die.

9. A machine of the class described, comprising a rotatable horn for receiving the tubular part of a receptacle closure thereover, the exterior surface of said horn being shaped to form a die, a rotatable die movable toward said horn to coöperate with the surface of said horn to change the shape of the receptacle closure, and an independently rotatable sleeve on said horn having an exterior surface portion shaped to mate a portion of said rotatable die.

10. A machine of the class described comprising a pair of dies, one of said dies being rotatable, and said rotatable die having an independently rotatable sleeve thereon formed with parts to mate said other die.

11. In a machine of the class described, a pair of dies having portions shaped to mate each other, and a freely movable member carried by one of said dies having a surface portion shaped and arranged to mate a portion of the other die independently of said first mentioned mating portions.

In testimony whereof I affix my signature in the presence of two witnesses.

LESLIE R. N. CARVALHO.

Witnesses:
L. GERSFORD HANDY,
LOUELLA F. LITTLE.